US011601573B2

(12) United States Patent
Tamura et al.

(10) Patent No.: US 11,601,573 B2
(45) Date of Patent: Mar. 7, 2023

(54) IMAGE PICKUP APPARATUS HAVING A STRUCTURE FOR DISSIPATING HEAT

(71) Applicant: CANON KABUSHIKI KAISHA, Tokyo (JP)

(72) Inventors: Koji Tamura, Kanagawa (JP); Takashi Yoshida, Tokyo (JP); Kenji Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/673,423

(22) Filed: Feb. 16, 2022

(65) Prior Publication Data

US 2022/0294956 A1 Sep. 15, 2022

(30) Foreign Application Priority Data

Mar. 12, 2021 (JP) .............................. JP2021-040118

(51) Int. Cl.
*H04N 5/225* (2006.01)
*H04N 5/232* (2006.01)

(52) U.S. Cl.
CPC ....... *H04N 5/22521* (2018.08); *H04N 5/2253* (2013.01); *H04N 5/2254* (2013.01); *H04N 5/22525* (2018.08); *H04N 5/23287* (2013.01)

(58) Field of Classification Search
CPC .................................................... G03B 17/55
See application file for complete search history.

(56) References Cited

U.S. PATENT DOCUMENTS

| 10,727,155 | B2 * | 7/2020 | Shibata | ............ H04N 5/225251 |
| 10,771,659 | B2 * | 9/2020 | Arai | ................... H05K 7/20409 |
| 11,076,072 | B2 * | 7/2021 | Yamagata | .............. G03B 17/55 |
| 11,415,866 | B2 * | 8/2022 | Nakamura | ........... G03B 17/563 |
| 2009/0310311 | A1 * | 12/2009 | Kondoh | ............. H05K 7/20445 361/707 |
| 2014/0055671 | A1 * | 2/2014 | Kawamura | .......... H04N 5/2253 348/374 |
| 2016/0301819 | A1 * | 10/2016 | Petty | ................... H04N 5/22521 |
| 2018/0263104 | A1 * | 9/2018 | Hamada | ............... H04N 5/2253 |
| 2019/0373765 | A1 * | 12/2019 | Naito | ............... G02F 1/133385 |
| 2022/0294953 | A1 * | 9/2022 | Saiki | ..................... G06F 1/1658 |
| 2022/0294954 | A1 * | 9/2022 | Ishii | ................... H04N 5/22521 |
| 2022/0294955 | A1 * | 9/2022 | Yoshida | ............... H04N 5/2252 |

FOREIGN PATENT DOCUMENTS

| JP | 2015204422 A | 11/2015 |
| JP | 2017228876 A | 12/2017 |

* cited by examiner

*Primary Examiner* — Gary C Vieaux (74) *Attorney, Agent, or Firm* — Canon U.S.A., Inc. I.P. Division

(57) ABSTRACT

An image pickup apparatus, having a grip portion, an image sensor, and a mount portion receives attachment of an interchangeable lens, includes a control circuit, a display panel disposed on a rear face side of an exterior member, and a heat dissipation fan disposed on a bottom surface side of the exterior member. The image sensor, control circuit, and display panel are arranged in an optical axis direction. A duct, having a first vent, is disposed between the grip and mount portions of a front face of the exterior member, extends in the optical axis direction from a top toward a bottom surface side between substrates of the image sensor and the control circuit, and connects to a second vent formed across an optical axis. The heat dissipation fan is disposed inside the duct and is located on bottom surface sides of the image sensor and the control circuit substrates.

9 Claims, 10 Drawing Sheets

IMAGE PICKUP APPARATUS HAVING A STRUCTURE FOR DISSIPATING HEAT

BACKGROUND

Field

The present disclosure relates to an image pickup apparatus having a structure for dissipating heat generated by a heat source.

Description of the Related Art

Mounted components in the apparatuses have been remarkably downsized and densified with demands for downsizing of electronic apparatuses.

Meanwhile, demands for high functionality of an image pickup apparatus, in particular, high performance of a moving image function, have been strong, and the amount of heat generated in the apparatuses has been increasing.

Moving image capturing in a high-temperature environment is highly likely to cause a malfunction or degradation of a mounted component as the temperature in the image pickup apparatus increases, and to cause a failure of the image pickup apparatus eventually.

Furthermore, an image pickup apparatus that corrects blur by moving an image sensor in a direction orthogonal to an optical axis direction to improve image quality has been in widespread use.

In such an image pickup apparatus of blur correction type as well, heat generated in the image sensor affects image quality when driving a blur correction mechanism, during continuous image capturing, or during moving image capturing, and it is therefore desirable to sufficiently dissipate the heat.

In a case where the amount of natural heat dissipation is not sufficient with respect to the amount of heat generated in the image pickup apparatus, a heat dissipation structure by forced air cooling using a fan is therefore utilized.

Japanese Patent Application Laid-Open No. 2017-228876 discusses an apparatus in which air in a gap between a heat sink for an image sensor and a heat sink for a circuit board facing each other is discharged to outside using a fan disposed at a camera bottom surface.

Japanese Patent Application Laid-Open No. 2015-204422 discusses an apparatus in which an L-shaped heat sink and duct having a fan is disposed between an image sensor and a main substrate.

However, the apparatus discussed in Japanese Patent Application Laid-Open No. 2017-228876 described above has an issue that outside dust and foreign particles easily enter the apparatus because outside air is directly taken into the apparatus.

The apparatus discussed in Japanese Patent Application Laid-Open No. 2015-204422 also has an issue that the size of the apparatus can be increased because the fan is disposed in a part of the heat sink and duct.

SUMMARY

The present disclosure is directed to providing an image pickup apparatus that achieves satisfactory heat dissipation performance while suppressing an increase in the size of the apparatus.

According to an aspect of the present disclosure, an image pickup apparatus having a grip portion, an image sensor, and a mount portion configured to receive attachment of an interchangeable lens includes a control circuit configured to control the image pickup apparatus, a display panel disposed on a rear face side of an exterior member, and a heat dissipation fan disposed on a bottom surface side of the exterior member, wherein an image sensor substrate mounted with the image sensor, a control circuit substrate mounted with the control circuit, and the display panel are arranged in order from a front face side to a rear face side in an optical axis direction, wherein a duct, having a first vent formed in the duct, is disposed between the grip portion and the mount portion of a front face of the exterior member, extends from the front face side toward the rear face side in the optical axis direction, extends from a top surface side toward a bottom surface side through an area between the image sensor substrate and the control circuit substrate, and connects to a second vent formed across an optical axis from the first vent and formed in a front face or a side face on the bottom surface side of the exterior member, and wherein the heat dissipation fan is disposed inside the duct and is located on the bottom surface side of each of the image sensor substrate and the control circuit substrate.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings.

The dimensions, materials, shapes, relative positions, and the like of components to be described below are to be modified as appropriate depending on the configuration or various conditions of an apparatus to which the disclosure is applied.

Hence, those are not intended to limit the scope of the present disclosure to the following description.

Known techniques in the technical field of the present disclosure is applicable to a configuration and a process that are not illustrated or described. Similar description may not be repeated.

In the drawings, the same reference numeral is used to indicate identical or functionally similar elements.

(Block Diagram Illustrating Configuration Example of Digital Camera in Exemplary Embodiment)

Figure 10:
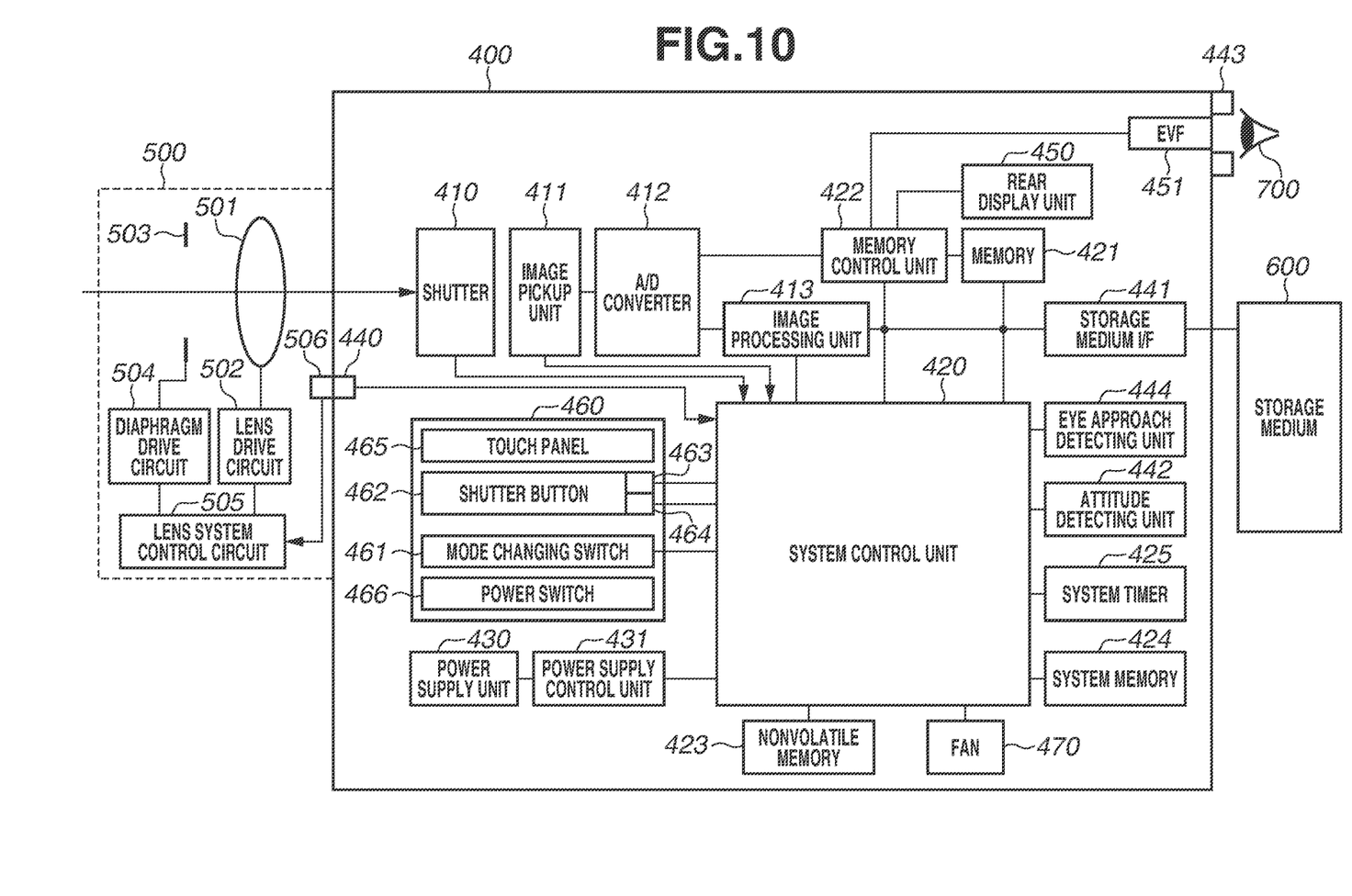
FIG. 10 is a block diagram according to an exemplary embodiment of the present disclosure.

FIG. 10 is a block diagram illustrating a configuration example of a digital camera 400 in an exemplary embodiment of the present disclosure.

A shutter 410 is a focal plane shutter that can freely control the exposure period of an image pickup unit 411 described below. A system control unit 420 described below performs such control.

The image pickup unit 411 is an image pickup device having an imaging plane for forming a subject image (optical image) passing through a lens 501. The image pickup unit 411 outputs an electrical signal (analog signal) based on the optical image of the imaging plane by photoelectric conversion.

A charge coupled device (CCD) sensor or a complementary metal oxide semiconductor (CMOS) sensor is used as the image pickup unit 411.

An analog-to-digital (A/D) converter 412 is a signal conversion unit used to convert the analog signal output from the image pickup unit 411 into a digital signal.

An image processing unit 413 is an image calculation unit that performs resizing processing, such as predetermined pixel interpolation and reduction, and color conversion processing, for the digital signal from the A/D converter 412 or a digital signal from a below-described memory control unit 422, to generate image data.

The system control unit 420 controls the aperture position and the lens position, based on the calculation result obtained by the image processing unit 413.

The image processing unit 413 further performs calculation processing using the above-described image data, and performs through-the-lens (TTL) automatic white balance (AWB) processing, based on the obtained calculation result.

The system control unit 420 is a control unit consisting of at least one processor or circuit, and controls the entire digital camera 400.

The system control unit 420 executes a program stored in a nonvolatile memory 423 described below, thereby implementing each type of processing according to the exemplary embodiment of the present disclosure.

A memory 421 is a storage unit that temporarily stores the digital signal converted by the A/D converter 412 from the analog signal output from the image pickup unit 411, and the image data generated by the image processing unit 413.

The memory 421 has a sufficient storage capacity to store a predetermined number of still images, and a moving image and sound for a predetermined time.

The memory control unit 422 is a memory controller that controls transmission and reception of data controlled by the system control unit 420 to and from the A/D converter 412, the image processing unit 413, and the memory 421.

The digital signal output from the A/D converter 412 is directly written in the memory 421 via the image processing unit 413 and the memory control unit 422, or via only the memory control unit 422.

The nonvolatile memory 423 is an electrically erasable and recordable read-only storage unit. The nonvolatile memory 423 stores, for example, constants, and programs for operating the system control unit 420.

A system memory 424 is a readable and writable storage unit that stores, for example, the constants, variables, and programs read out from the nonvolatile memory 423 for operating the system control unit 420.

A system timer 425 is a clocking unit that measures a length of time before executing automatic power-off for turning off various display members described below, and an exposure period.

The automatic power-off includes a function of turning off various display members described below in order to prevent battery consumption in a case where it is determined that a photographer is not operating the digital camera 400.

A power supply unit 430 consists of, for example, a primary battery such as an alkaline battery or a lithium battery, a secondary battery such as a nickel-cadmium (NiCd) battery, a nickel metal halide (NiMH) battery, or a lithium-ion (Li) battery, and an alternating current (AC) adapter.

A power supply control unit 431 includes a circuit that detects the power supply unit 430 to be a power source for driving the digital camera 400, a direct current to direct current (DC-DC) converter, and a switch circuit that switches between power supply destinations.

The power supply unit 430 detects attachment/detachment of a battery, a battery type, and a remaining battery level.

The power supply control unit 431 controls the DC-DC converter based on the above-described detection result and an instruction of the system control unit 420, and supplies a desirable voltage to a supply destination at desirable timing.

A communication terminal 440 is included in the digital camera 400 and electrically connected to a lens communication terminal 506 described below.

The system control unit 420 that controls the entire digital camera 400 can communicate with a lens unit 500 described below, by electrically connecting the communication terminal 440.

A storage medium interface (I/F) 441 is an interface with a storage medium 600 described below.

An attitude detecting unit 442 detects an attitude of the digital camera 400 with respect to the gravity direction.

The attitude detecting unit 442 outputs orientation information indicating whether an image picked up by the image pickup unit 411 is an image captured by the digital camera 400 held horizontally or an image captured by the digital camera 400 held vertically, based on the attitude detected by the attitude detecting unit 442.

The system control unit 420 can add the orientation information output by the attitude detecting unit 442 to the image data.

The attitude detecting unit 442 may use, for example, an acceleration sensor, and a gyroscope sensor.

In a case where the acceleration sensor and the gyroscope sensor are used for the attitude detecting unit 442, a motion status (e.g., panning, tilting, being lifted, or being still) of the digital camera 400 can be detected.

An eyepiece portion 443 is a portion to be approached (eye approach) by an eye (an object) 700 of a photographer, in the digital camera 400.

An eye approach detecting unit 444 is an approach (eye approach) detection sensor that detects approach (eye approach) and separation (eye separation) of the eye 700 to and from the eyepiece portion 443.

The eye approach detecting unit 444 detects approach of the eye 700 to the eyepiece portion 443, based on the presence/absence of light received by a light-receiving unit (not illustrated) of an infrared proximity sensor.

After the detection of the eye approach, the system control unit 420 determines that the current state is an eye approach state until the eye separation is detected.

After the detection of the eye separation, the system control unit 420 determines that the current state is a non-eye approach state until the eye approach is detected.

The infrared proximity sensor is an example, and other type of sensor may be adopted for the eye approach detecting unit 444 as long as the sensor can detect approach of an eye or object as the eye approach.

The memory 421 described above doubles as a memory (video memory) for image display.

The digital signal or the image data written in the memory 421 is displayed on a rear display unit 450 or an electronic view finder (EVF) 451 via the memory control unit 422.

The rear display unit 450 performs display based on a signal from the memory control unit 422.

The EVF 451 performs display based on a signal from the memory control unit 422 in a case where the eye approach is detected by the eye approach detecting unit 444.

The digital signals recorded in the memory 421 after being converted by t the A/D converter 412 from the analog signals generated by the image pickup unit 411 are sequentially transferred to the rear display unit 450 or the EVF 451 to be displayed.

Live view capturing display, which is real-time display, can be thereby performed.

The system control unit 420 switches between display (a display state) and non-display (a non-display state) of each of the rear display unit 450 and the EVF 451, depending on the state detected by the eye approach detecting unit 444 described above.

In the non-eye approach state, the rear display unit 450 is switched to the display state, and the EVF 451 is switched to the non-display state.

In the eye approach state, the EVF 451 is switched to the display state, and the rear display unit 450 is switched to the non-display state.

An operation unit 460 represents various operation members serving as an input unit that accepts operations from a user.

The operation unit 460 includes various operation members (a mode changing switch 461, a shutter button 462, a first shutter switch 463, a second shutter switch 464, a touch panel 465, and a power switch 466) described below.

The operation unit 460 is an operation device for inputting various movement instructions into the system control unit 420.

The mode changing switch 461 changes the operating mode of the system control unit 420 to any of modes including a still image capturing mode and a moving image capturing mode.

The still image capturing mode includes an automatic image capturing mode, an automatic scene determination mode, and a manual image capturing mode, as image capturing modes.

The still image capturing mode further includes an aperture priority mode (Av mode), a shutter speed priority mode (Tv mode), and a program automatic exposure (AE) mode (P mode), as image capturing modes.

The moving image capturing mode may similarly include a plurality of image capturing modes.

The shutter button 462 is a button for a photographer to give an image capturing preparation instruction and an image capturing instruction.

The first shutter switch 463 is turned on when the shutter button 462 in the digital camera 400 is operated halfway, i.e., by a so-called half press (the image capturing preparation instruction), thereby generating a first shutter switch signal SW1.

Based on the first shutter switch signal SW1, the digital camera 400 starts image capturing operation, such as automatic focus (AF) processing, AE processing, and AWB processing.

The second shutter switch 464 is turned on when operating the shutter button 462 is completed, i.e., by a so-called full press (the image capturing instruction), thereby generating a second shutter switch signal SW2.

Based on the second shutter switch signal SW2, the system control unit 420 performs a series of steps from the readout of the analog signal from the image pickup unit 411 to the signal conversion processing with the A/D converter 412 and the image processing unit 413.

The system control unit 420 also starts below-described image capturing processing operation up to the stage where the image data temporarily recorded in the memory 421 is written in the storage medium 600.

The touch panel 465 is a device that detects a touch or a drag operation carried out by a photographer.

Here, the touch panel 465 is integral with the rear display unit 450, and can be operated by touching a display portion of the rear display unit 450 with a finger.

The power switch 466 switches between power-on and power-off. The power supply control unit 431 controls power supply from the power supply unit 430, based on the switching operation of the power switch 466.

A fan 470 is disposed inside a duct described below in an exemplary embodiment of the present disclosure.

The fan 470 is controlled by the system control unit 420 to exhaust heat from a heat source in the digital camera 400 to the outside by causing an airflow.

The lens unit 500 is an interchangeable lens that can be detachably attached to the digital camera 400.

The lens 501 is a lens group for generating an optical image (subject image) from subject light reflected by a subject, and is composed of a plurality of lenses, but only one lens is illustrated in FIG. 10 for simplification.

The lens communication terminal 506 is a communication terminal for the lens unit 500 to communicate with the digital camera 400.

The lens unit 500 can communicate with the system control unit 420 that controls the entire digital camera 400, by electrically connecting the lens communication terminal 506 to the communication terminal 440 as described above.

The system control unit 420 communicates with lens system control circuit 505 and a diaphragm drive circuit 504, thereby being able to control the position of a diaphragm 503 and the focus state of a real image displaced by the lens 501.

The storage medium 600 is a medium, such as a memory card, that can be detachably attached to the digital camera 400 and is intended to store a captured image.

Examples of the storage medium 600 include a secure digital (SD) card, a FLASH (registered trademark) memory, and a hard disk.

(Perspective View of Digital Camera)

Figure 1A:
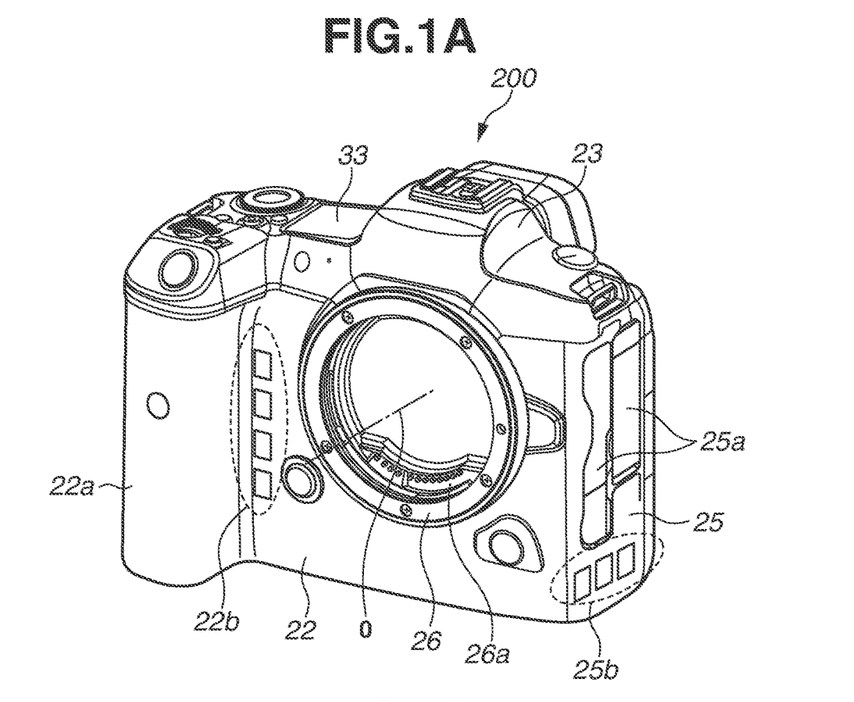
FIGS. 1A and 1B are perspective views of a digital camera according to a first exemplary embodiment of the present disclosure.
Figure 1B:
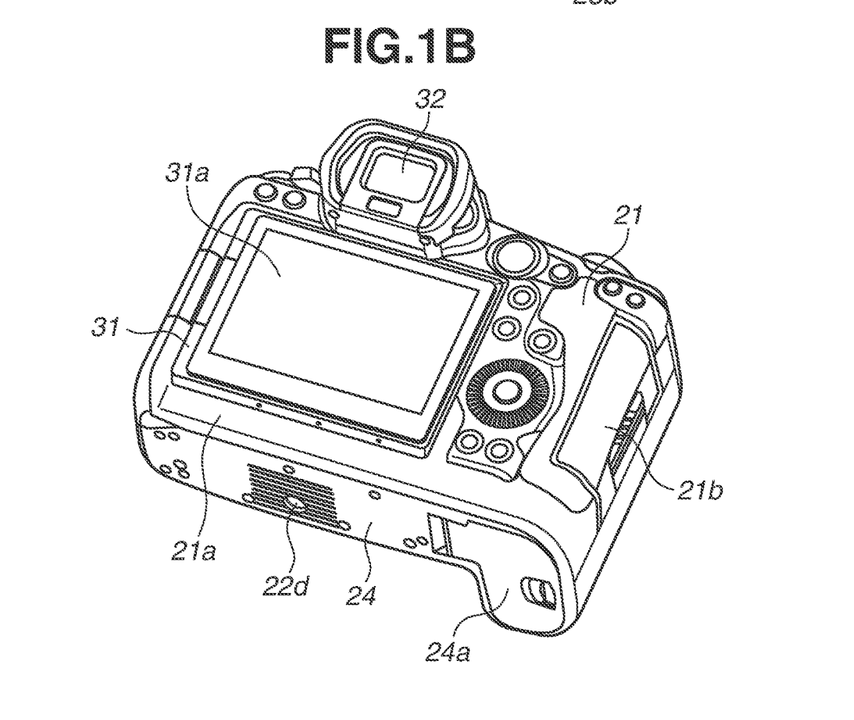

FIG. 1A is a front perspective view of a digital camera 200. FIG. 1B is a rear perspective view of the digital camera 200, according to a first exemplary embodiment.

Various operation members for operating the digital camera 200 are attached to a rear cover 21. These operation members and display members are not relevant to the present disclosure and thus will not be described.

A display unit storing portion 21a is provided to store a rear display unit described below.

A cover 21b is provided to protect an opening portion of a storage medium interface (IF) that stores a memory card for recording a captured image.

A front base 22 is a member with which a grip portion 22a is integrally formed. The grip portion 22a has a shape for enabling a user to easily grasp the grip portion 22a with the right hand when holding the digital camera 200.

A vent 22b is a portion formed in the front base 22 to take air into a duct described below.

A tripod mount 22d is provided.

Various operation members for operating the digital camera 200 are attached to a top cover 23. These operation members and display members are not relevant to the present disclosure and thus will not be described.

A shoulder display unit 33 consisting of, for example, a liquid crystal panel for checking various setting states, is attached to the top cover 23.

A bottom cover 24 is a member to which a battery cover 24a for battery attachment/detachment is attached.

A side cover 25 is a member in which a vent 25b for exhausting air of the duct described below is formed.

A terminal cover 25a is a cover for protecting an external communication terminal provided to connect a connection cable with an external apparatus (not illustrated) and mounted on a main substrate described below.

A mount 26 is a portion to which an interchangeable lens (not illustrated) is detachably attached.

An axis passing through the center of the mount 26 is an imaging optical axis 0.

A lens communication terminal 26a electrically communicates with the above-described interchangeable lens.

A rear display unit 31 consists of, for example, a liquid crystal panel. A preview image of an image sensor and various setting states can be displayed and set using a rear liquid crystal display (LCD) portion 31a that can detect a touch operation on a display screen.

The rear display unit 31 is a so-called vari-angle monitor rotatably attached to the digital camera 200, and is stored in the display unit storing portion 21a provided in the rear cover 21.

A finder 32 is a so-called electronic view finder that outputs an image output from an image sensor unit described below on a view finder display unit, so that a user can visually check a subject image.

(Perspective View of Internal Structure of Digital Camera)

Figure 2:
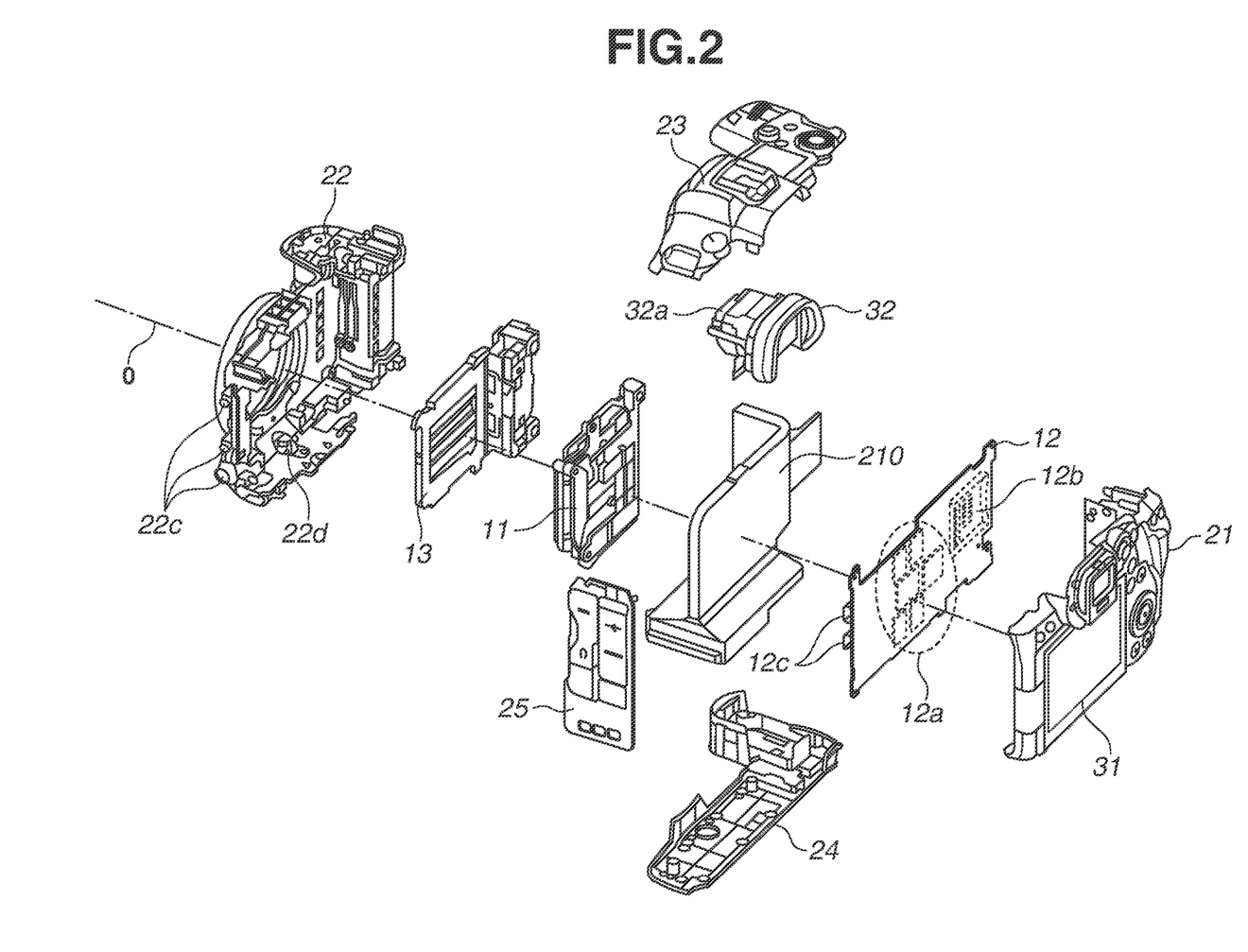
FIG. 2 is an exploded perspective view of a main part of the digital camera according to the first exemplary embodiment of the present disclosure.

FIG. 2 is an exploded perspective view of a main part of an internal structure of the digital camera 200.

As illustrated in FIG. 2, the exterior of the digital camera 200 is formed by the rear cover 21, the front base 22, the top cover 23, the bottom cover 24, and the side cover 25 described above.

An image sensor unit 11, a main substrate 12, a duct 210, a shutter 13, and the finder 32 are disposed in the digital camera 200.

The image sensor unit 11 is composed of a movable unit including a CMOS sensor, and a fixed unit (described in detail below).

On the main substrate 12, a control integrated circuit (IC) group 12a for controlling an image pickup signal, a storage medium IF 12b for storing an external storage medium, and an external communication terminal 12c for connecting a connection cable to connect with an external apparatus (not illustrated) are mounted.

The external communication terminal 12c is covered by the terminal cover 25a as described above.

Various of other electronic components, such as an IC, a chip resistor, a chip capacitor, an inductor, a transistor, and an interface connector are also mounted (not illustrated), but will not be described.

An external communication terminal 22c for connecting a connection cable with an external apparatus (not illustrated) is attached to the front base 22, and is covered by the terminal cover 25a.

A finder display unit 32a for displaying an image output from the above-described image sensor unit 11 is attached to the finder 32.

A centrifugal fan (heat dissipation fan) is built in the duct 210, and causes an airflow in the duct 210 (described in detail below).

Among the components of the digital camera 200, the image sensor unit 11, the control IC group 12a, the storage medium IF 12b (memory card), and the finder display unit 32a consume a large amount of power and also produce a large amount of heat.

The temperature thus sharply rises in each of these members.

In addition, the temperature further rises due to radiant heat of peripheral members, in addition to heat generated by each component.

The image-capturing time of the digital camera 200 is limited by the operation guarantee temperature of each member.

In order to maintain a long image-capturing time, The image sensor unit 11, the control IC group 12a, the storage medium IF 12b (memory card), and the finder display unit 32a, which are the heat sources, are cooled.

It may also be desirable to take measures to prevent the temperature from exceeding the operation guarantee temperature.

In the present exemplary embodiment, the duct 210 is thus surrounded by the image sensor unit 11, the main substrate 12, and the finder 32 that are the heat sources, as illustrated in FIG. 2.

These heat sources are made to be in thermal contact with the duct 210 by using a heat dissipation mechanism 220 described below, and thereby cooled.

(Thermal Connection Between Duct and Each Heat Source)

Figure 3:
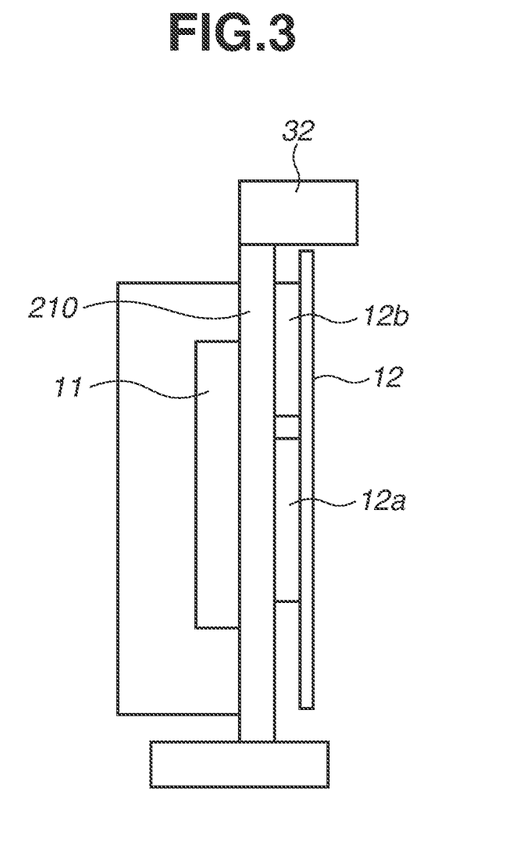
FIG. 3 is a schematic diagram illustrating a main part of the digital camera according to the first exemplary embodiment of the present disclosure.

FIG. 3 is a schematic diagram for easy understanding of the positional relationship between the duct 210 and each of the heat sources.

As illustrated in FIG. 3, the duct 210 is disposed to be located between the image sensor unit 11 and the control IC group 12a and the storage medium IF 12b mounted on the main substrate 12, and under the finder 32.

The thermal connection between the duct 210 and each of the heat sources is achieved by the heat dissipation mechanism 220 described below.

In such a way, the duct 210 is surrounded by the heat sources and the thermal connection is thereby achieved in the shortest distance, and therefore, heat loss for the thermal connection is minimized (External Shape of Duct)

Figure 4:
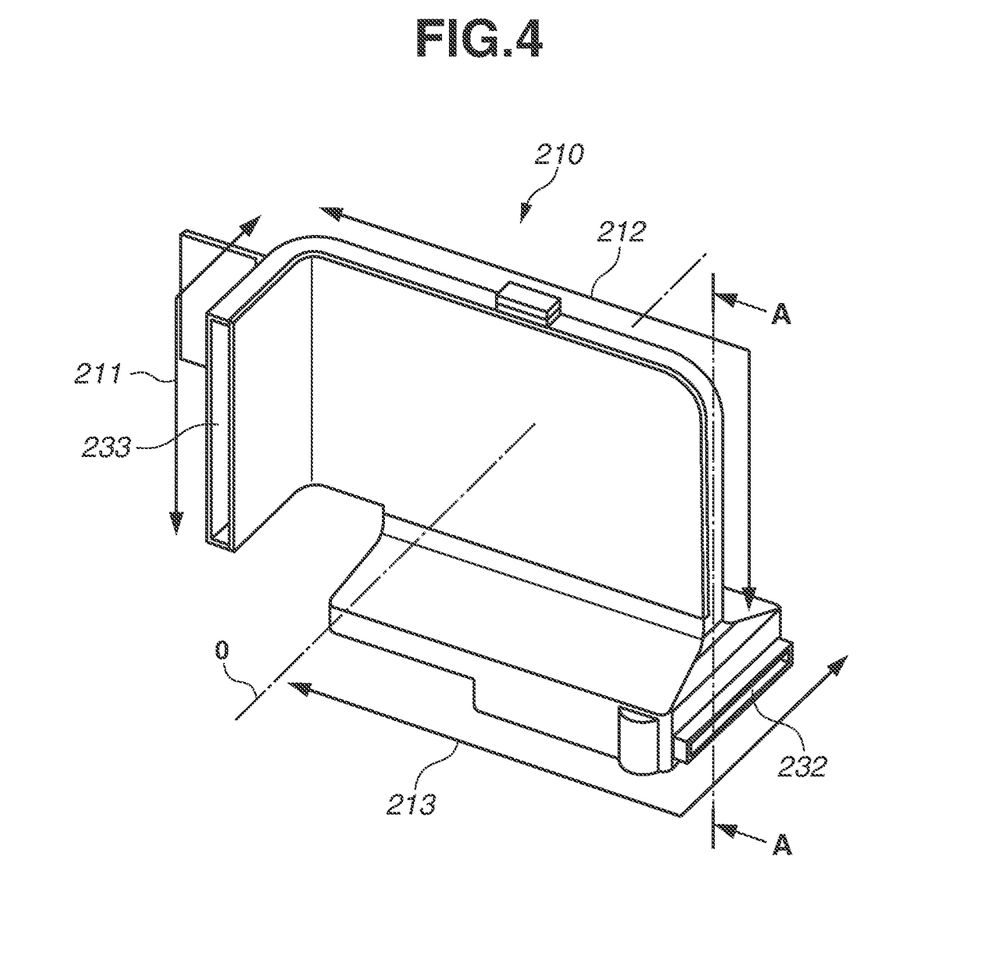
FIG. 4 is an external perspective view of a duct according to the first exemplary embodiment of the present disclosure.
Figure 5:
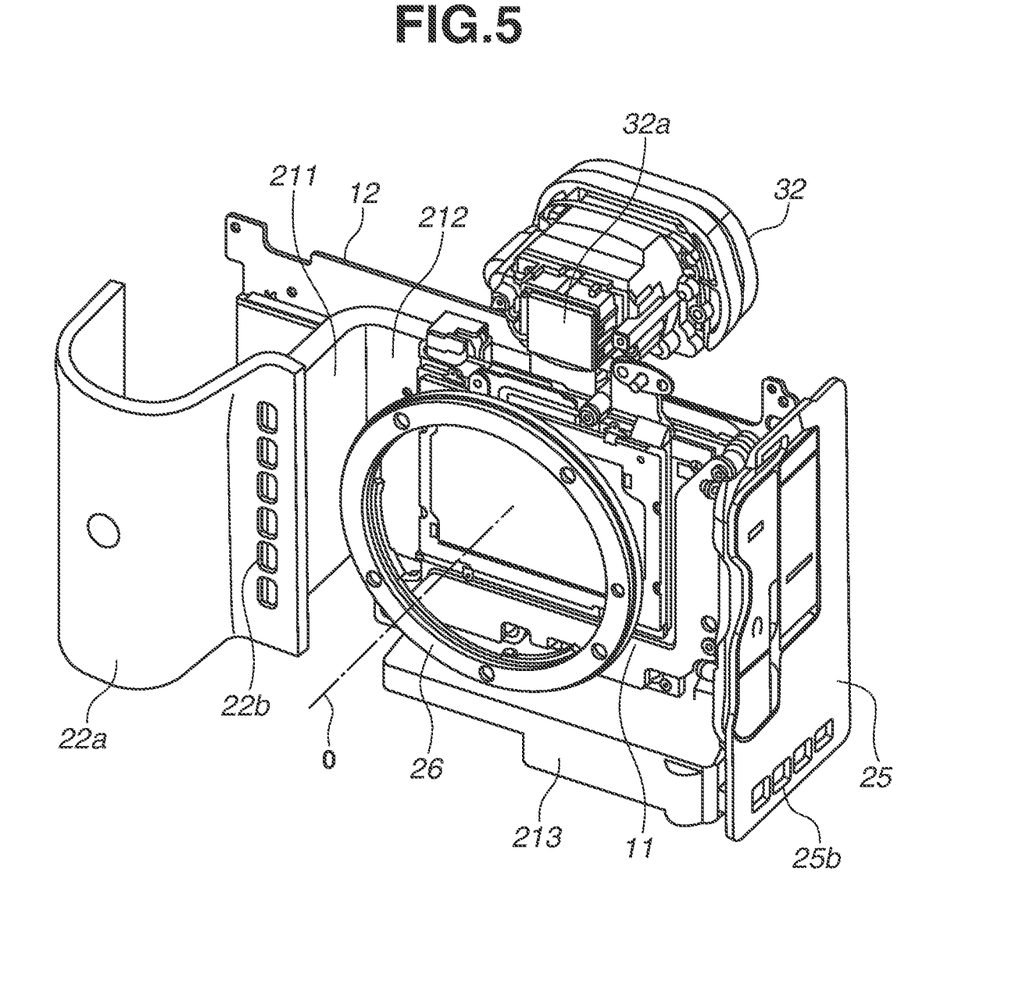
FIG. 5 illustrates a layout of a part including the duct according to the first exemplary embodiment of the present disclosure.

FIG. 4 is an external perspective view of the duct 210. FIG. 5 is a diagram illustrating a layout of a part including the duct 210.

The external shape of the duct 210 will be described in detail with reference to FIG. 4 and FIG. 5.

As illustrated in FIG. 4, the duct 210 is composed of a first duct portion 211, a second duct portion 212, and a third duct portion 213.

The first duct portion 211 is formed to be substantially parallel with the imaging optical axis 0, and located between the mount 26 and the grip portion 22a.

The second duct portion 212 is formed to be substantially perpendicular to the imaging optical axis 0, and located between the two heat sources, i.e., the image sensor unit 11 and the control IC group 12a mounted on the main substrate 12.

The second duct portion 212 is formed to be placed below the finder display unit 32a attached to the finder 32 that is also the heat source.

The third duct portion 213 is formed to be substantially parallel to the imaging optical axis 0, and located below the two heat sources, i.e., the image sensor unit 11 and the control IC group 12a mounted on the main substrate 12.

The first duct portion 211 is provided with an air inlet 233.

An elastic member (not illustrated) is disposed between the air inlet 233 and the vent 22b disposed in the front base 22, so that a portion between the air inlet 233 and the vent 22b is sealed.

The third duct portion 213 is provided with an air outlet 232.

An elastic member (not illustrated) is disposed between the air outlet 232 and the vent 25b of the side cover 25, so that a portion between the air outlet 232 and the vent 25b is sealed.

Using the above-described configuration, the space between the vent 22b and the vent 25b is formed as one closed space.

An airflow path is thereby formed, and outside moisture, sand, or the like can be prevented from entering the digital camera 200.

The airflow in the duct 210 will be described in detail below.

(Exploded Perspective View of Configuration of Duct)

Figure 6:
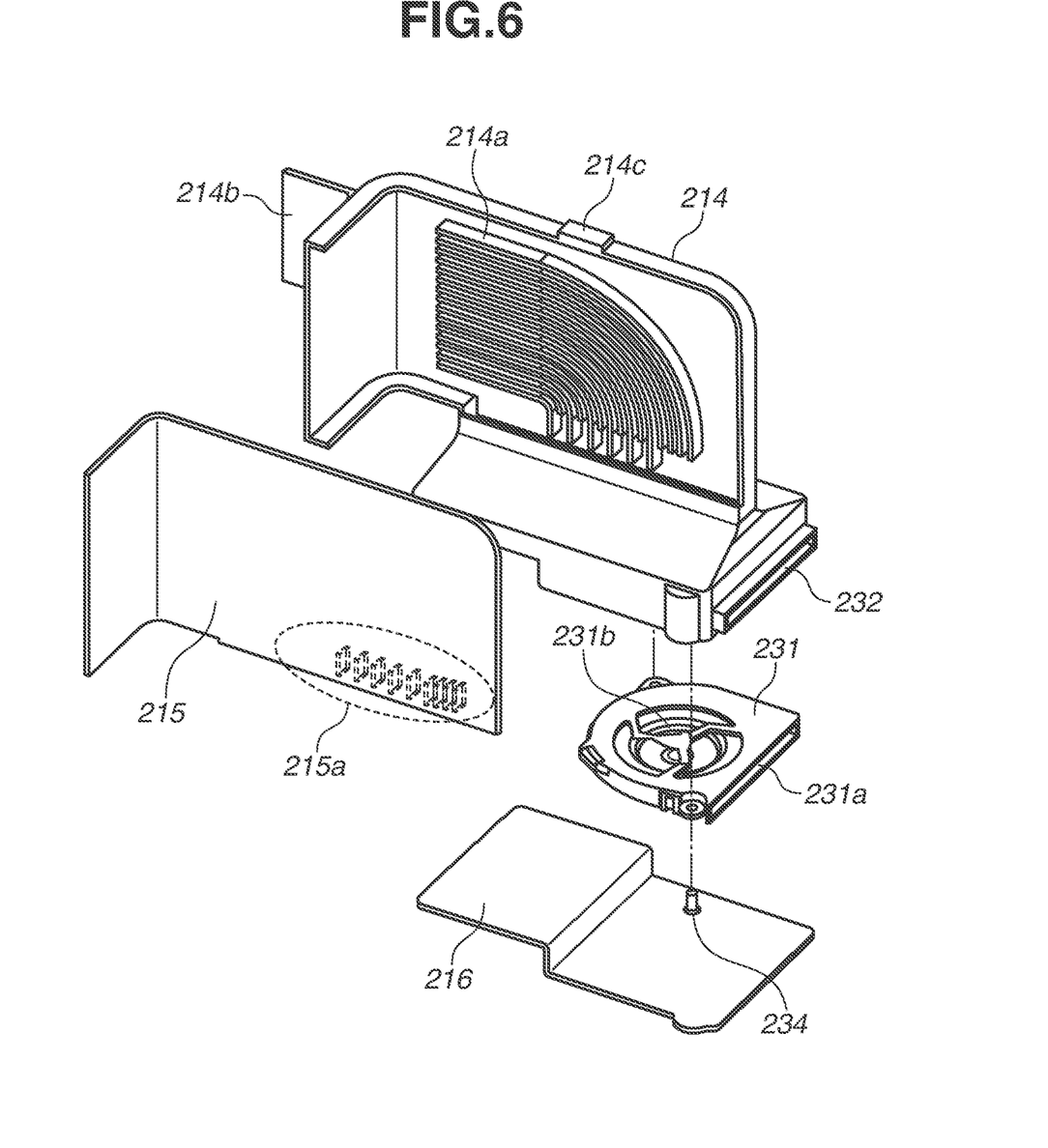
FIG. 6 is an exploded perspective view of the duct according to the first exemplary embodiment of the present disclosure.

FIG. 6 is an exploded perspective view of a configuration of the duct 210.

The duct 210 is composed of a duct base 214 as a duct main body, a front duct cover 215, and a bottom duct cover 216.

The front duct cover 215 and the bottom duct cover 216 are fixed to the duct base 214 to sandwich an elastic member (not illustrated) interposed therebetween. One closed space is thereby formed in the duct 210.

For fixing the front duct cover 215 and the bottom duct cover 216, any method may be adopted as long as these covers are sealed and fixed, and any fastening method such as screwing, adhesion, or calking can be used as long as such a purpose can be achieved.

The duct base 214, the front duct cover 215, and the bottom duct cover 216 efficiently dissipate the heat from the heat sources to cool the air.

The duct base 214, the front duct cover 215, and the bottom duct cover 216 are each made of, preferably, a material having high heat conductivity and low specific gravity and not easily affecting the weight of the digital camera 200. In the present exemplary embodiment, the material is an aluminum metal.

Forming the duct 210 using a metallic member makes it possible to use the duct 210 as a ground housing for the digital camera 200, and thus is also advantageous in terms of noise resistance.

The duct base 214 is provided with a fin 214a having a convex shape, thereby increasing the surface area of the duct base 214, dissipating the heat from the heat sources, and raising cooling efficiency.

The duct base 214 is further provided with a side extension portion 214b and a top extension portion 214c to contact with the storage medium IF 12b and the finder display unit 32a that are the heat sources.

The above-described air outlet 232 is also formed in the duct base 214.

The front duct cover 215 is provided with a fin 215a having a convex shape, as with the duct base 214.

This increases the surface area of the front duct cover 215, dissipates the heat from the heat sources, and raises the cooling efficiency.

A centrifugal fan (heat dissipation fan) 231 is a blower unit for producing an airflow in the duct 210, and is fixed to the bottom surface of the duct base 214 by a screw 234.

The centrifugal fan 231 has a centrifugal fan air outlet 231a and a centrifugal fan air inlet 231b.

(Airflow in Duct)

Figure 7:
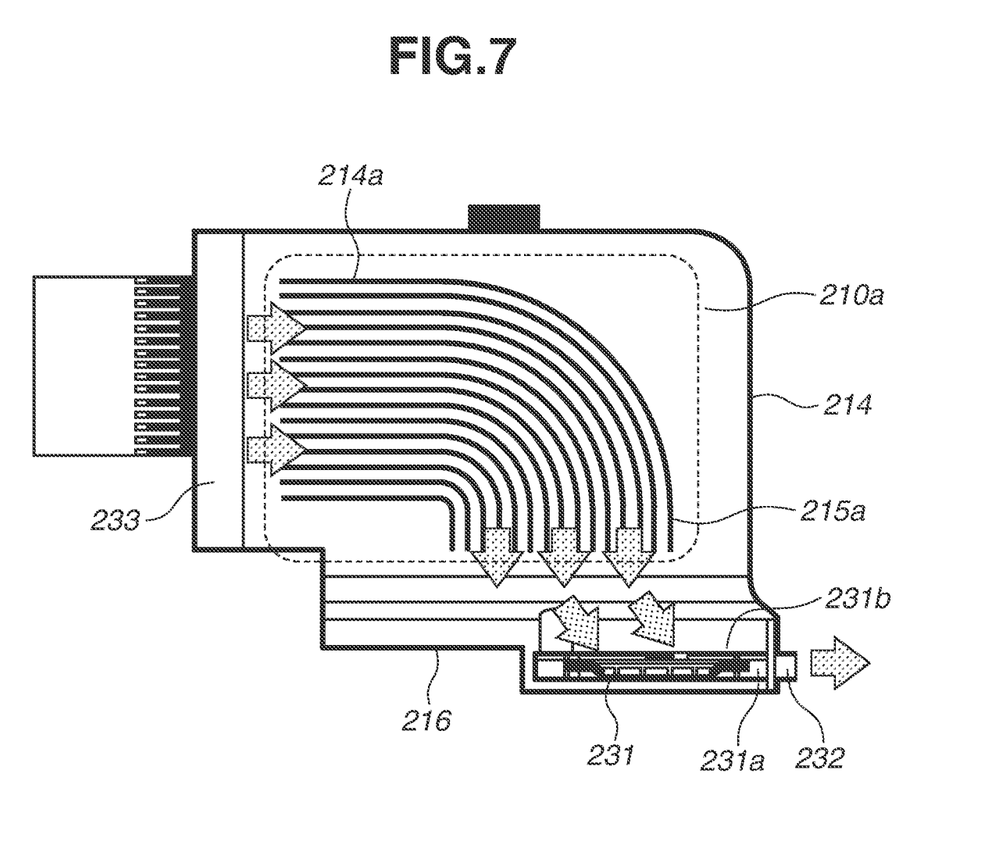
FIG. 7 is a cross-sectional view of the duct according to the first exemplary embodiment of the present disclosure.

FIG. 7 is a cross-sectional view of the duct 210, taken along a line A-A illustrated in FIG. 4.

In FIG. 7, arrows each indicate an airflow in the duct 210.

The fin 214a and the fin 215a are combined by attaching the front duct cover 215 to the duct base 214, so that a fin 210a is formed.

An airflow path from the air inlet 233 to the centrifugal fan air inlet 231b is thereby formed.

When the centrifugal fan 231 is driven, air taken into the air inlet 233 passes through the fin 210a.

During this passage of the air, the fin 214a and the fin 215a warmed by the heat sources are cooled.

The air passing through the fin 210a flows into the centrifugal fan air inlet 231b.

The air is exhausted to the centrifugal fan air outlet 231a by a blade (not illustrated) in the centrifugal fan air inlet 231b, and then exhausted to the outside of the digital camera 200 via the air outlet 232.

In the airflow in the present exemplary embodiment, the air is taken into the air inlet 233 and exhausted to the air outlet 232 as described above.

However, the centrifugal fan 231 may be driven in reverse to take air into the air outlet 232 and exhaust the taken air to the air inlet 233, as long as a desired cooling effect can be achieved.

In the present exemplary embodiment, the centrifugal fan is used as the blower unit, but the blower unit is not limited thereto, and may be any type of member such as an axial fan as long as the purpose can be achieved.

(Description of Heat Dissipation Mechanism)

Figures 8A, 8B:
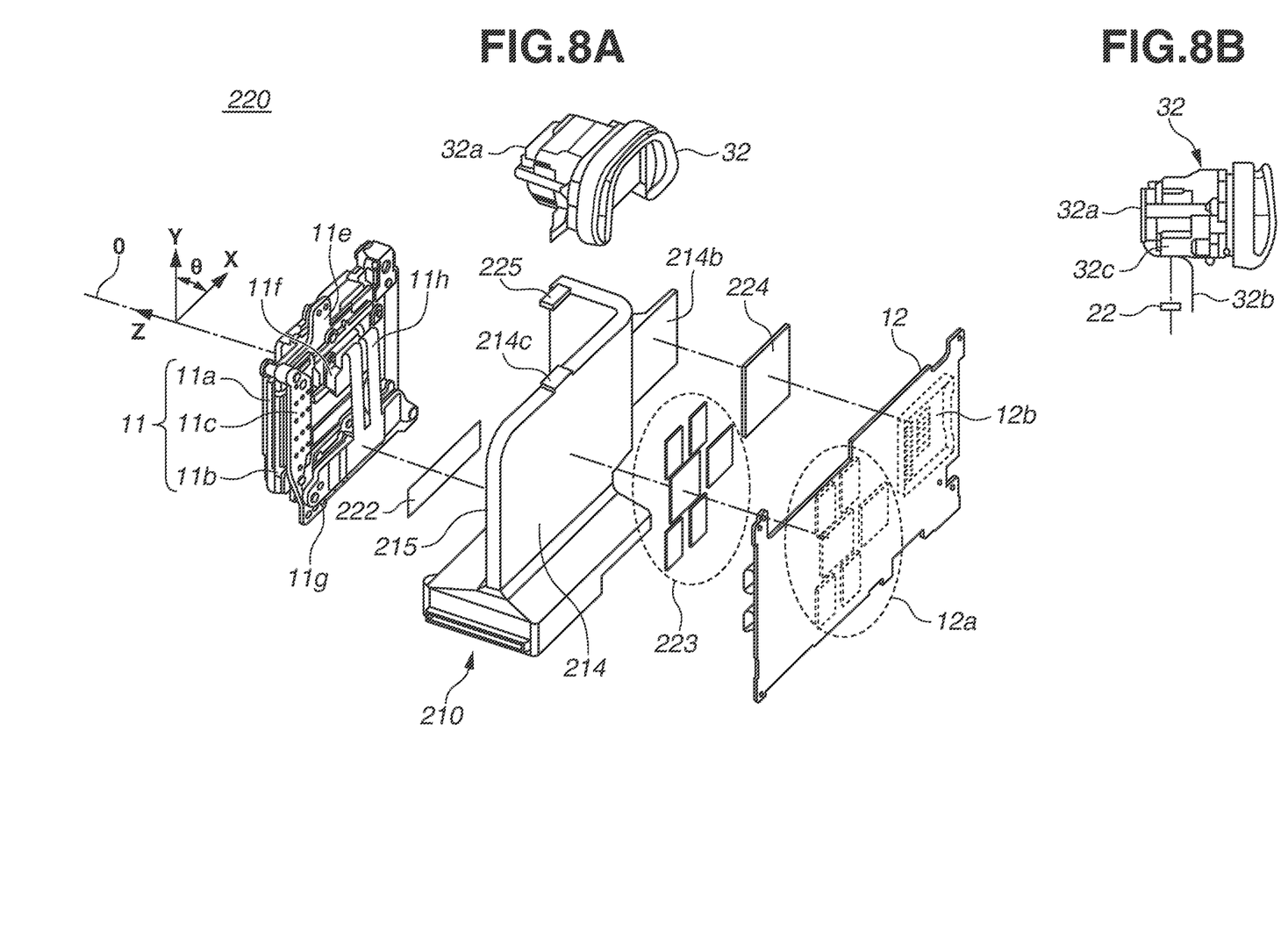
FIGS. 8a and 8B are diagrams illustrating a heat dissipation mechanism according to the first exemplary embodiment of the present disclosure.

FIGS. 8A and 8B illustrate the heat dissipation mechanism 220. FIG. 8A is an exploded perspective view, and FIG. 8B is a diagram for supplementary explanation.

The image sensor unit 11 is composed of a movable unit 11b and a fixed unit 11c, the movable unit 11b including a CMOS sensor 11a.

The movable unit 11b is fixed to a base member 11e in the fixed unit 11c.

A coil (not illustrated) in the movable unit 11b and a magnet (not illustrated) in the fixed unit 11c perform displacement in X, Y, and θ directions with respect to the imaging optical axis 0, thereby implementing image blur correction.

A heat dissipation plate 11f in the movable unit 11b conducts heat generated in the CMOS sensor 11a.

One end of a graphite sheet 11h is connected to the heat dissipation plate 11f, and the other end is connected to a magnet plate 11g in the fixed unit 11c.

The heat generated in the CMOS sensor 11a is conducted to the magnet plate 11g by using the above-described configuration.

A first heat conduction member 222 having elasticity is disposed between the magnet plate 11g and the front duct cover 215 to be in contact with these members, thereby thermally connecting the image sensor unit 11 and the duct 210.

A second heat conduction member 223 having elasticity is disposed between the control IC group 12a mounted on the main substrate 12 and the duct base 214.

The second heat conduction member 223 is in contact with the control IC group 12a and the duct base 214, thereby thermally connecting the control IC group 12a and the duct 210.

A third heat conduction member 224 having elasticity is disposed between the storage medium IF 12b mounted on the main substrate 12 and the side extension portion 214b of the duct base 214.

The third heat conduction member 224 is in contact with the storage medium IF 12b and the side extension portion 214b, thereby thermally connecting the storage medium IF 12b and the duct 210.

A fourth heat conduction member 225 having elasticity is disposed between the finder display unit 32a in the finder 32 and the top extension portion 214c of the duct base 214.

The fourth heat conduction member 225 thereby thermally connects the finder display unit 32a and the duct 210.

Specifically, a flexible printed circuit (FPC) board 32b extends from the finder display unit 32a, and runs on the bottom surface of a main body 32c of the finder 32.

The FPC board 32b running on the bottom surface and the top extension portion 214c are thermally connected by the fourth heat conduction member 225.

In the above-described exemplary embodiment, the duct 210 and each of the heat sources are thermally connected by the heat conduction members having elasticity, but are not limited thereto.

For example, other type of member such as a graphite sheet or a heat pipe may be used as long as the purpose can be achieved.

In the first exemplary embodiment, the control IC group 12a and the storage medium IF 12b that are the heat sources in the digital camera 200 are described as a heat dissipation mechanism in a case where these components are mounted on a single substrate (the main substrate 12).

However, the disclosure according to the present disclosure is not limited thereto.

A modification of the first exemplary embodiment will be described below.

Figure 9:
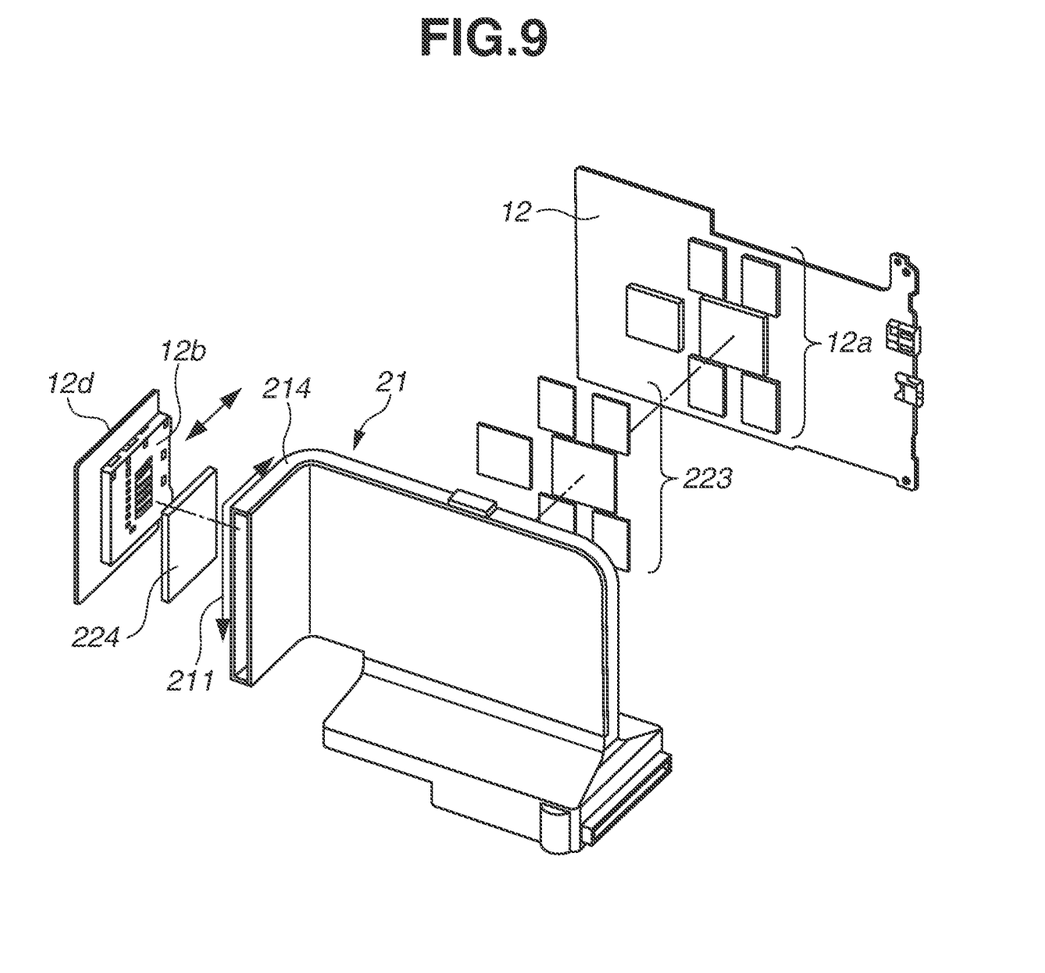
FIG. 9 illustrates a modification of a main substrate according to the first exemplary embodiment of the present disclosure.

FIG. 9 illustrates a heat dissipation mechanism in a case where the control IC group 12a and the storage medium IF 12b are mounted on the respective substrates.

A storage medium IF substrate 12d is divided from the main substrate 12. The storage medium IF 12b is mounted on the storage medium IF substrate 12d.

The memory card is therefore attached and detached in a direction toward the main substrate 12 as indicated by a two-headed arrow, i.e., at the rear face of the digital camera 200.

The third heat conduction member 224 is disposed between the storage medium IF 12b mounted on the storage medium IF substrate 12d and the duct base 214 forming the first duct portion 211.

The third heat conduction member 224 is in contact with the storage medium IF 12b and the duct base 214 forming the first duct portion 211, thereby thermally connecting the storage medium IF 12b and the duct 210.

The control IC group 12a mounted on the main substrate 12 is thermally connected to the duct 210 via the second heat conduction member 223 in a manner similar to that described above.

In this way, the attachment/detachment of the memory card is not necessarily limited to the side face of the digital camera 200, and may be modified as appropriate according to the specifications of the digital camera 200.

The first exemplary embodiment and the modification are each described as an example to describe the techniques of the present disclosure.

The techniques of the present disclosure can be appropriately modified or combined and performed without departing from the scope of the present disclosure.

Specifically, the present disclosure is not limited to the digital camera, and is widely applicable to electronic apparatuses and image pickup apparatuses each having a moving image capturing function, such as a video camera and a network camera.

(Comparative Data of Heat Dissipation Effect)

TABLE 1

|  | Digital camera (for comparison) (without fan) | Digital camera according to first exemplary embodiment (with fan) |
| --- | --- | --- |
| Image sensor unit 11 | 111.5° C. | 61.8° C. |
| Main substrate 12 | 95.6° C. | 88.5° C. |

Table 1 indicates the results of comparison between the digital camera according to the first exemplary embodiment and a digital camera for comparison in which the centrifugal fan 231 and the duct 210 are not built, in terms of the highest reached temperature when moving image capturing is executed with 8K30P in each of the digital cameras under an environment where the temperature is 23° C.

8K30P means that moving image capturing is performed with 8K resolution at 30 frames per second.

In the first exemplary embodiment, the centrifugal fan 231 is operated at a wind velocity of 12 liter per minute (L/min). L/min is a unit of volume flow rate.

As indicated in Table 1, the highest reached temperature of the image sensor unit 11 has decreased from 111.5° C. to 61.8° C., and the highest reached temperature of the main substrate 12 has decreased from 95.6° C. to 88.5° C., as a result of having the centrifugal fan 231 and the duct 210 built in.

This indicates that a rise in the temperature of the heat source is reduced.

In a case where the limit temperature for stopping the functions of the digital camera is 95° C. or lower, providing the configuration according to the first exemplary embodiment can realize unlimited image capturing with 8K30P under the environment where the temperature is 23° C.

The present exemplary embodiment will be briefly described.

An image pickup apparatus (digital camera) 200 has a grip portion, a mount portion to which an interchangeable lens is attached, and an image sensor.

The image pickup apparatus 200 includes a control circuit 12a that controls the image pickup apparatus 200, a display panel (rear display unit) 31 disposed on the rear face side of exterior members 21 to 25, and a heat dissipation fan (centrifugal fan) 231 disposed on the bottom surface side of the exterior member.

An image sensor substrate (image sensor unit) 11 mounted with the image sensor, a control circuit substrate (main substrate) 12 mounted with the control circuit, and the display panel 31 are arranged in order from the front face side to the rear face side in an optical axis direction.

A duct 210 in which a first vent (air outlet) 232 is formed is disposed between the grip portion 22a and the mount portion (mount) 26 of a front face 22 of the exterior member, and extends from the front face side toward the rear face side in the optical axis direction.

The duct 210 extends from the top surface side toward the bottom surface side through an area between the image sensor substrate 11 and the control circuit substrate 12.

The duct 210 connects to a second vent formed across the optical axis from the first vent 232 and formed in the front face or the side face on the bottom surface side of the exterior member.

The heat dissipation fan 231 is disposed inside the duct 210 located on the bottom surface side of each of the image sensor substrate 11 and the control circuit substrate 12.

The duct 210 has a first duct portion 211 extending from the front face side toward the rear face side.

The duct 210 also has a second duct portion 212 extending from the top surface side toward the bottom surface side through the area between the image sensor substrate 11 and the control circuit substrate 12.

The duct 210 further has a third duct portion 213 having a second vent (air inlet) 233 formed in the front face 22 or a side face (side cover) 25 of the exterior member on the bottom surface side.

An electronic view finder 32 is disposed on the exterior member (top cover) 23 on the top surface side of the image pickup apparatus.

A storage medium is mounted on the control circuit substrate 12.

The second duct portion 212 has a side face extension portion 214b facing the storage medium, and a top surface extension portion 214c facing the electronic view finder 32.

The image sensor thermally connects to the front face side of the second duct portion 212 via a first heat conduction member 222, and the control circuit thermally connects to the rear face side of the second duct portion 212 via a second heat conduction member 223.

The storage medium thermally connects to the side face extension portion 214b via the third heat conduction member 224, and the electronic view finder 32 thermally connects to the top surface extension portion 214c via the fourth heat conduction member 225.

A storage medium IF substrate 12d is mounted with a storage medium.

The storage medium thermally connects to the side face of the first duct portion 211 via a fifth heat conduction member.

The second duct portion 212 has a first fin 214a formed on a surface opposite to a surface in contact with the first heat conduction member 222, of the second duct portion 212, inside the second duct portion 212.

The second duct portion 212 has a second fin 215a formed on a surface opposite to a surface in contact with the second heat conduction member, of the second duct portion 212.

The temperature of heat generated by the image sensor is higher than the temperature of heat generated by the control circuit 12a.

The image sensor substrate 11 moves in a direction different from the optical axis to perform image blur correction.

The image sensor substrate 11 moves in a direction different from the optical axis 0 to perform image blur correction, by a movable mechanism. The movable mechanism is composed of a coil, and a voice coil motor (VCM) consisting of a magnet.

The image sensor substrate 11 is driven based on a vibration detection result of an angular velocity detection (gyroscope) sensor not illustrated.

The image sensor substrate 11 is moved in a yaw direction, a pitch direction, and a roll direction, around the optical axis of an image pickup optical system, in order to correct image blur on an imaging plane of the image sensor caused by a shake of a user.

A rotation shaft of the heat dissipation fan 231 extends in a direction orthogonal to the optical axis.

The second vent 233 formed on the bottom surface side of the exterior member is formed in the front face 22 or the side face 25 of the exterior member.

The techniques of the present disclosure are used in an electronic apparatus and an image capturing system.

According to an exemplary embodiment of the present disclosure, it is possible to achieve satisfactory heat dissipation performance while suppressing an increase in the size of an apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-040118, filed Mar. 12, 2021, which is hereby incorporated by reference herein in its entirety.

What is claimed is:

1. An image pickup apparatus having a grip portion, an image sensor, and a mount portion configured to receive attachment of an interchangeable lens, the image pickup apparatus comprising:
a control circuit configured to control the image pickup apparatus;
a display panel disposed on a rear face side of an exterior member; and
a heat dissipation fan disposed on a bottom surface side of the exterior member,
wherein an image sensor substrate mounted with the image sensor, a control circuit substrate mounted with the control circuit, and the display panel are arranged in order from a front face side to a rear face side in an optical axis direction,
wherein a duct in which a first vent is formed is disposed between the grip portion and the mount portion of a front face of the exterior member, extends from the front face side toward the rear face side in the optical axis direction, extends from a top surface side toward a bottom surface side through an area between the image sensor substrate and the control circuit substrate, and connects to a second vent formed across an optical axis from the first vent and formed in a front face or a side face on the bottom surface side of the exterior member, and
wherein the heat dissipation fan is disposed inside the duct and is located on the bottom surface side of each of the image sensor substrate and the control circuit substrate.

2. The image pickup apparatus according to claim 1, wherein the duct has a first duct portion, a second duct portion, and a third duct portion that are connected, and wherein the first duct portion extends from the front face side toward the rear face side, the second duct portion extends from the top surface side toward the bottom surface side and passes through the area between the image sensor substrate and the control circuit substrate, and the third duct portion has the second vent formed in the front face or the side face on the bottom surface side of the exterior member.

3. The image pickup apparatus according to claim 2, further comprising a storage medium mounted on the control circuit substrate, wherein an electronic view finder is disposed on the exterior member on the top surface side of the image pickup apparatus, and wherein the second duct portion has a side face extension portion facing the storage medium, and a top surface extension portion facing the electronic view finder.

4. The image pickup apparatus according to claim 3, wherein the image sensor thermally connects to a front face side of the second duct portion via a first heat conduction member, wherein the control circuit thermally connects to a rear face side of the second duct portion via a second heat conduction member, wherein the storage medium thermally connects to the side face extension portion via a third heat conduction member, and wherein the electronic view finder thermally connects to the top surface extension portion via a fourth heat conduction member.

5. The image pickup apparatus according to claim 4, wherein the second duct portion has a first fin formed on a surface opposite to a surface in contact with the first heat conduction member, of the second duct portion, and a second fin formed on a surface opposite to a surface in contact with the second heat conduction member, of the second duct portion, inside the second duct portion.

6. The image pickup apparatus according to claim 1, further comprising a storage medium substrate mounted with a storage medium, wherein the storage medium thermally connects to a side face of the first duct portion via a fifth heat conduction member.

7. The image pickup apparatus according to claim 1, wherein a temperature of heat generated by the image sensor is higher than a temperature of heat generated by the control circuit.

8. The image pickup apparatus according to claim 1, wherein the image sensor substrate moves in a direction different from the optical axis to perform image blur correction.

9. The image pickup apparatus according to claim 1, wherein a rotation shaft of the heat dissipation fan extends in a direction orthogonal to the optical axis, and the second vent formed on the bottom surface side of the exterior member is formed in the front face or the side face on the bottom surface side of the exterior member.

* * * * *